United States Patent
Philibert

(10) Patent No.: US 11,359,287 B2
(45) Date of Patent: Jun. 14, 2022

(54) ADHESION BETWEEN POLYMER SUBSTRATES AND AUTOCATALYTIC PLATES

(71) Applicant: The Boeing Company, Chicago, IL (US)

(72) Inventor: Jospeh J. Philibert, St. Louis, MS (US)

(73) Assignee: The Boeing Company, Chicago, IL (US)

( * ) Notice: Subject to any disclaimer, the term of this patent is extended or adjusted under 35 U.S.C. 154(b) by 525 days.

(21) Appl. No.: 16/528,923

(22) Filed: Aug. 1, 2019

(65) Prior Publication Data

US 2021/0032755 A1 Feb. 4, 2021

(51) Int. Cl.
| | | |
|---|---|---|
| *C23C 18/20* | (2006.01) | |
| *C08J 7/14* | (2006.01) | |
| *B33Y 70/00* | (2020.01) | |
| *C23C 18/16* | (2006.01) | |
| *B33Y 80/00* | (2015.01) | |
| *B33Y 10/00* | (2015.01) | |

(52) U.S. Cl.
CPC .............. *C23C 18/20* (2013.01); *B33Y 70/00* (2014.12); *C08J 7/14* (2013.01); *C23C 18/1641* (2013.01); *B33Y 10/00* (2014.12); *B33Y 80/00* (2014.12); *C08J 2377/02* (2013.01)

(58) Field of Classification Search
USPC ......................................... 428/457, 483, 485
See application file for complete search history.

(56) References Cited

PUBLICATIONS

Alexandre Garcia, Microscopic Study of a Ligand Induced Electroless Plating Process onto Polymers, ACS Applied Materials & Interfaces, Nov. 5, 2010, pp. 3043-3051, vol. 2, No. 11, www.acsami.org.

Dongdong Li, Fabrication of Conductive Silver Microtubes Using Natural Catkin as a Template, ACS Omega, 2017, pp. 1738-1745, vol. 2, ACS Publications.

*Primary Examiner* — Terressa Boykin
(74) *Attorney, Agent, or Firm* — Kunzler Bean & Adamson

(57) ABSTRACT

Provided is a method and apparatus for improving adhesion between a polymer article and a metal plate. The method includes providing a polymer article, and hydrolyzing a surface of the polymer article using an acidic solution to obtain carboxylic acid groups at the surface. The method also includes grafting polyphenols to the carboxylic acid groups by esterification that is catalyzed by the acidic solution, and chelating metal ions to the grafted polyphenols to form polyphenol-metal complexes. The apparatus includes a body formed by additive manufacturing, and a metal plating formed on a surface of the body by electroless metal plating after a surface preparation process. The surface preparation process includes treating the surface with an acidic solution to obtain carboxylic acid groups at the surface, treating the surface with a polyphenol solution to obtain polyphenols grafted to the carboxylic acid groups, and chelating metal ions to the polyphenols.

20 Claims, 3 Drawing Sheets

ADHESION BETWEEN POLYMER SUBSTRATES AND AUTOCATALYTIC PLATES

FIELD

This disclosure relates generally to additive manufacturing, and more particularly to metallic plating of polymer substrates formed by additive manufacturing.

BACKGROUND

Additive manufacturing is utilized to fabricate 3-dimensional (3D) parts or products by adding layer-upon-layer of material. Additive manufacturing systems utilize 3D-modeling (i.e., CAD) software, computer-controlled additive-manufacturing equipment, and raw materials (feed stocks) in powder, wire, or liquid form. A variety of raw materials may be used in additive manufacturing to create products. Examples of such materials include plastics, metals, concrete, and glass. Some raw materials have material property limitations which limit potential applications. One way to improve on these limitations is to add a plating which can improve stiffness, chemical/corrosion resistance, and flammability characteristics. Unfortunately, some base materials do not allow for proper adhesion of the plating material.

SUMMARY

The subject matter of the present application has been developed in response to the present state of the art, and in particular, in response to the shortcomings of metal-plating methods of polymer articles, that have not yet been fully solved by currently available techniques. Accordingly, the subject matter of the present application has been developed to provide a method and apparatus that overcome at least some of the above-discussed shortcomings of prior art techniques.

The following is a non-exhaustive list of examples, which may or may not be claimed, of the subject matter, disclosed herein.

Disclosed herein is a method includes providing a polymer article, and hydrolyzing a surface of the polymer article using an acidic solution to obtain carboxylic acid groups at the surface. The method also includes grafting polyphenols to the carboxylic acid groups by esterification that is catalyzed by the acidic solution, and chelating metal ions to the grafted polyphenols to form polyphenol-metal complexes. The preceding subject matter of this paragraph characterizes example 1 of the present disclosure.

The polymer article is formed by additive manufacturing. The preceding subject matter of this paragraph characterizes example 2 of the present disclosure, wherein example 2 also includes the subject matter according to example 1 above.

The polymer article is made of a synthetic polyamide. The preceding subject matter of this paragraph characterizes example 3 of the present disclosure, wherein example 3 also includes the subject matter according to example 2 above.

Examples of a synthetic polyamide suitable for use in the present disclosure include, but are not limited to, polyamide 11, and polyamide 12. The preceding subject matter of this paragraph characterizes example 4 of the present disclosure, wherein example 4 also includes the subject matter according to example 3 above.

The polyphenol is tannic acid. The preceding subject matter of this paragraph characterizes example 5 of the present disclosure, wherein example 5 includes the subject matter according to example 1 above.

The method of chelating metal ions includes treating the surface with a metal salt solution. The preceding subject matter of this paragraph characterizes example 6 of the present disclosure, wherein example 6 includes the subject matter according to example 1 above.

The metal salt solution has a metal selected from the group consisting of Fe, Ni, Ru, Rh, Pd, Ag, Os, Ir, Pt, and Au. The preceding subject matter of this paragraph characterizes example 7 of the present disclosure, wherein example 7 includes the subject matter according to example 6 above.

Additionally disclosed herein is a body formed by additive manufacturing, and a metal plating formed on a surface of the body by electroless metal plating subsequent to a surface preparation process. The surface preparation process includes, in certain examples, treating the surface with an acidic solution to obtain carboxylic acid groups at the surface, treating the surface with a polyphenol solution to obtain polyphenols grafted to the carboxylic acid groups, and chelating metal ions to the polyphenols. The preceding subject matter of this paragraph characterizes example 8 of the present disclosure.

The body is made of a synthetic polyamide. The preceding subject matter of this paragraph characterizes example 9 of the present disclosure, wherein example 9 includes the subject matter according to example 8 above.

Examples of suitable polyamides include polyamide 11, and polyamide 12. The preceding subject matter of this paragraph characterizes example 10 of the present disclosure, wherein example 10 includes the subject matter according to example 9 above.

The polyphenol is tannic acid. The preceding subject matter of this paragraph characterizes example 11 of the present disclosure, wherein example 11 includes the subject matter according to example 8 above.

The surface preparation process also includes treating the surface with a metal salt solution. The preceding subject matter of this paragraph characterizes example 12 of the present disclosure, wherein example 12 includes the subject matter according to example 8 above.

The metal salt solution has a metal selected from the Fe, Ni, Ru, Rh, Pd, Ag, Os, Ir, Pt, and Au. The preceding subject matter of this paragraph characterizes example 13 of the present disclosure, wherein example 13 also includes the subject matter according to example 12 above.

Additionally disclosed herein is a method of metal plating a polymer article. The method includes treating a polymer article with an acidic solution to hydrolyze a surface of the polymer article and obtain carboxylic acid groups at the surface, treating the polymer article with a polyphenol solution to graft polyphenol molecules to the carboxylic acid groups, treating the polymer article with a metal salt solution to form polyphenol-metal complexes, and treating the polymer article with an electroless metal plating bath to metal plate the surface. The preceding subject matter of this paragraph characterizes example 14 of the present disclosure.

The polymer article is formed by additive manufacturing. The preceding subject matter of this paragraph characterizes example 15 of the present disclosure, wherein example 15 also includes the subject matter according to example 14 above.

The polymer article is made of a synthetic polyamide. The preceding subject matter of this paragraph characterizes example 16 of the present disclosure, wherein example 16 also includes the subject matter according to example 15 above.

The synthetic polyamide may be either polyamide 11 or polyamide 12. The preceding subject matter of this paragraph characterizes example 17 of the present disclosure, wherein example 17 also includes the subject matter according to example 16 above.

The polyphenol solution is tannic acid. The preceding subject matter of this paragraph characterizes example 18 of the present disclosure, wherein example 18 also includes the subject matter according to example 14 above.

Treating the polymer article with the metal salt solution includes chelating metal ions to the grafted polyphenol molecules. The preceding subject matter of this paragraph characterizes example 19 of the present disclosure, wherein example 19 also includes the subject matter according to example 14 above.

The metal salt solution has a metal selected from Fe, Ni, Ru, Rh, Pd, Ag, Os, Ir, Pt, and Au. The preceding subject matter of this paragraph characterizes example 20 of the present disclosure, wherein example 20 also includes the subject matter according to example 19 above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter and are not therefore to be considered to be limiting of its scope, the subject matter will be described and explained with additional specificity and detail through the use of the drawings, in which.

DETAILED DESCRIPTION

Figure 1A:
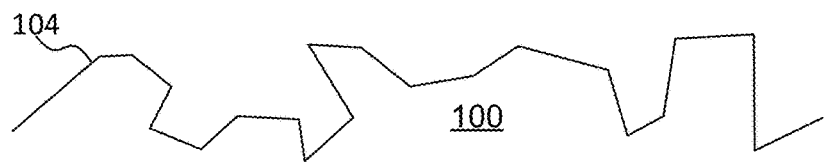
FIGS. 1a-1d are schematic diagrams illustrating different stages of a process for surface preparation of a polymer article that improves the adhesion of an electroless plating to a polymer article, in accordance with some examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples. Like reference numbers signify like elements throughout the description of the figures.

The method and apparatus of this disclosure provide an improvement to the adhesion between a polymer substrate and a metal plate. The methods described below are applicable to devices or apparatuses that are used in the manufacturing, assembly, or repair of an aircraft. However, the principles of the present disclosure may be applied to other industries, such as the automotive industry or other industries.

The methods embodied herein may be employed during any one of the steps of manufacturing, assembly, or repair of the aircraft. For example, components or subassemblies may be fabricated or manufactured for use in propulsion systems, electrical systems, hydraulic systems, environmental systems, etc. The methods described here may be utilized during the production of the aircraft to expedite assembly or reduce the cost of the aircraft through the use of additive manufacturing. Additive manufacturing is useful to create a wide variety of products having different shapes and sizes by forming the product layer-by-layer. Beneficially, the methods disclosed here improve stiffness, chemical corrosion resistance, and flammability characteristics of components/articles formed by additive manufacturing. These benefits and features will be described in greater detail below.

FIGS. 1a-1d are schematic diagrams illustrating different stages of a process for surface preparation of a polymer article that improves the adhesion of an electroless plating to a polymer article, in accordance with some examples of the present disclosure. Depicted in FIGS. 1a-1d is a portion of a cross-section of a polymer article ("article") 100 (formed by additive manufacturing) at different stages of the metal plating/coating process. The microscopic cross-section depicted is for illustrative purposes only to aid in the discussion of the process for improving adhesion between the article 100 and the metal plating 110. The surface 104 of the article 100, although depicted as jagged, when viewed by the naked eye may appear smooth.

The surface 104 of the article 100, formed by additive manufacturing, may have a rough surface finish, e.g., on the order of about 600-1000 microinches $R_a$. Such rough surfaces may have undesirable effects and limit applications of the article 100 in certain environments. Coating the article 100 with a metal to, in effect, mask the rough surface finish of the surface 104 helps to improve the effectiveness of and increase the applicability of the article 100.

In some examples, as shown in FIG. 1a, the article 100 is formed by one or more of the following additive manufacturing techniques, including, but not limited to, vat photopolymerization, material jetting, binder jetting, material extrusion, powder bed fusion, sheet lamination, or directed energy deposition. The methods of additive manufacturing described for the formation of the article 100 are not intended to be limiting, but are provided to demonstrate that many alternatives are possible, with all of the alternative intended to be within the scope of the present disclosure.

In certain examples, the article 100 is made of a polyamide. Suitable polyamides include condensation polymers formed of amines and carboxylic acids, and/or one or more aminocarboxylic acids. Polyamides include, but are not limited to, aliphatic, aromatic, and/or semi-aromatic polyamides. The polyamides may be homopolymer, copolymer, or higher order polymers. Additionally, the article 100 may be made of two or more different polyamides. In particular, the article 100 may be made of polyamide 11 (PA11) or polyamide 12 (PA12) polymers. PA11 is produced by the polymerization of 11-aminoundecanoic acid. The repeating unit of PA11 may be represented as $HN-(CH_2)_{10}-CO$, where $(CH_2)_{10}$ is the repeating unit R of the polymer chain. Similarly, PA12 may be represented as $HN-(CH_2)_{11}-CO$. It is contemplated that other polyamides may be suitable for use with the methods of the present disclosure. Examples of other polyamides include, but are not limited to, aliphatic polyamides such as polyamide 6; polyamide 6,6; polyamide 4,6; polyamide 6,9; polyamide 6,10; polyamide 6,12; polyamide 9,10; polyamide 9,12; polyamide 9,13; polyamide 9,14; polyamide 9,15; polyamide 6,16; etc.; semi-aromatic polyamides; polyterethalamides; and copolymers and mixtures of these polyamides.

Because the article 100 is made of a polymer (e.g., polyamides such as PA11 or PA12), traditional metal coating methods, that rely on high temperatures or electrical conductivity often fail. Beneficially, the methods and processes of the present disclosure enable the grafting of metal ions to the surface via a grafting mechanism that forms chemical bonds of a metal ion catalyst to the surface of the article 100 using a polyphenol solution. The metal ions present a suitable surface for metal coating.

Briefly stated, the method for improving adhesion between the article 100, which can be made of a polymer polyamide via additive manufacturing techniques as disclosed above, by metal coating the article 100 includes the steps of: (1) hydrolyzing the surface 104 the article 100 using a dilute acidic solution to create carboxylic acid groups on the surface 104; (2) treating the surface 104 with a polyphenol solution to graft polyphenol molecules to the carboxylic acid groups; (3) treating the surface 104 with a metal salt solution to form polyphenol-metal complexes; and (4) treating the surface 104 with an electroless metal plating bath to metal plate the surface. Each of these steps is described in greater detail below.

Regarding step (1), hydrolyzing the surface 104 of the article 100 includes treating the surface 104 with a dilute acidic solution. The acidic solution may be acetic acid ($CH_3COOH$) in the form of a liquid mixture. The acetic acid solution may have a pH in the range of between about 2.4 and 3.4, depending on the concentration of the acetic acid in an aqueous solution. In some examples, the concentration may be in the range of between about 0.01 M and 1.0 M. Buffers may be used including, but not limited to, bicarbonate, bisulphate, etc. The treatment of the surface with the acidic solution may be carried out at ambient temperatures, or alternatively at temperatures up to 75° C. Optionally, the treatment may be carried out in other inert gas environments such as nitrogen, argon, etc. The treatment of the dilute acidic solution may be applied for a time in the range of between about 15 and 30 minutes. The acetic acid solution hydrolyzes the surface of the article 100 to form carboxylic acid groups (COOH consisting of a carbonyl group and a hydroxyl group) on the surface 104 of the article 100.

Figure 1B:
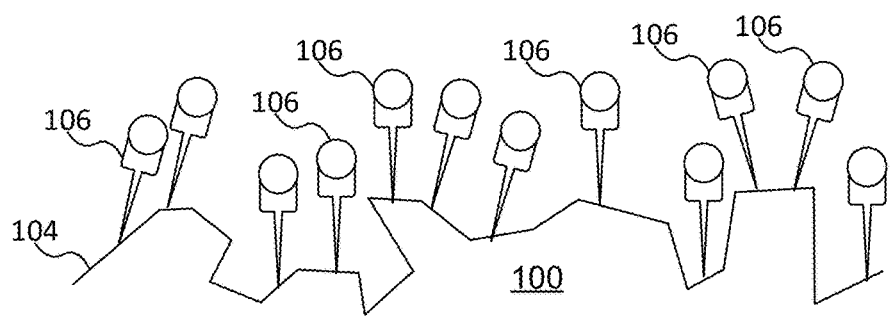

Surface carboxylic acid groups form intermolecular hydrogen bonds with polyphenols, which is advantageous for anchoring polyphenol-metal complexes 106 (see FIG. 1b). Following the treatment of the article with the acidic solution, the article 100 is treated with a polyphenol solution without rinsing the article 100. Acidic solution still present on the surface 104 of the article 100 catalyzes esterification to chemically bond alcohol groups of the polyphenol to carbonyl groups of the carboxylic acid groups. In certain examples, the polyphenol is tannic acid in an aqueous solution having a concentration in the range of between about 0.01 M and 10.0 M. The surface 104 may be treated in ambient conditions (e.g., ambient temperatures and pressures) for a dwell time in the range of between about 2 and 30 minutes. Alternatively, the temperature may be raised to above ambient temperatures, such as up to 75° C., and performed in an inert gas environment.

Following the treatment of the surface 104 with the polyphenol solution, the surface 104 of the article 100 is treated with a metal-salt solution to introduce metallic ions and chelate the metal ions with the polyphenol to form polyphenol-metal complexes 106, as depicted in FIG. 1b. Suitable metal-salt solutions include, but are not limited to, $FeCL_2$, $NiCL_2$, or other noble metal salts (i.e., salts formed from Fe, Ni, Ru, Rh, Pd, Ag, Os, Ir, Pt, and Au). The metal-salt solution may be applied for a period of time in the range of between about 10 minutes and 3 hours. Buffered saline solutions may optionally be added to maintain a pH in the range of between about 6.8 and 7.4. Following the metal-salt solution treatment, the article may be rinsed with water in preparation for metal plating.

Figure 1C:
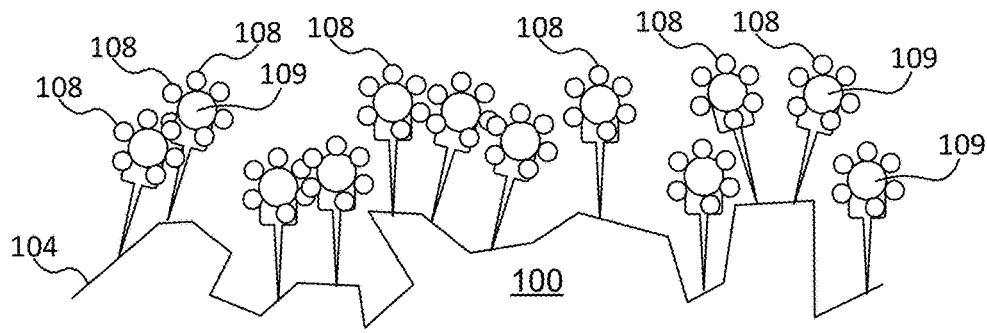
Figure 1D:
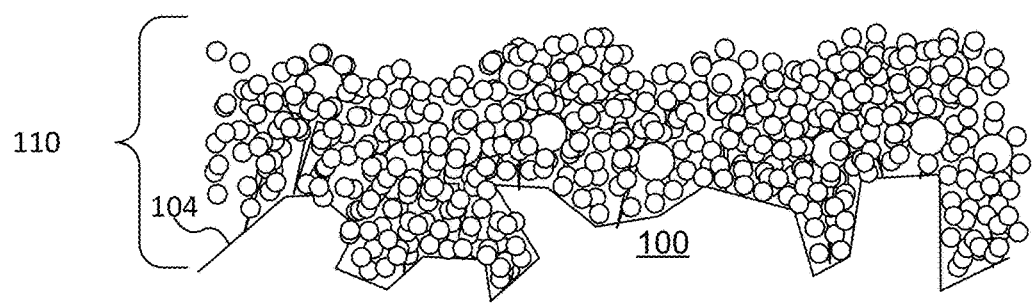

FIGS. 1c and 1d depict metal plating steps of the article 100. Metal molecules that form the metal plating 110 may now be deposited and adhered to the polyphenol-metal complexes 106. Metal coating or plating refers to processes such as electroless plating, electroplating, spraying, vapor deposition, immersion processes, solution dipping processes, and powder coating. Metals suitable for use include, but are not limited to, nickel, iron, copper, silver, cobalt, zinc, titanium, platinum, aluminum, palladium, lead, tin, etc., or any combination to form a metal alloy. In certain examples, improved metal-plating adhesion is achieved with electroless plating.

A thin layer of metal may be initially deposited (see FIG. 1c) by a chemical (electroless) deposition. FIG. 1c depicts how the metal ions 108 of the initial deposition may be deposited around the metal ions 109 of the polyphenol-metal complexes 106. Copper or nickel is used as the initial metal layer, in certain examples, however, in other examples, other metals are used. Further electroless deposition may be used, or alternatively, other types of electrolytic deposition may be used to increase the thickness of the metal layer (see FIG. 1d). The metal layer can be a single metal, or a metal alloy, and deposited to a thickness in the range of between about 1 and 50 microns.

Figure 2:
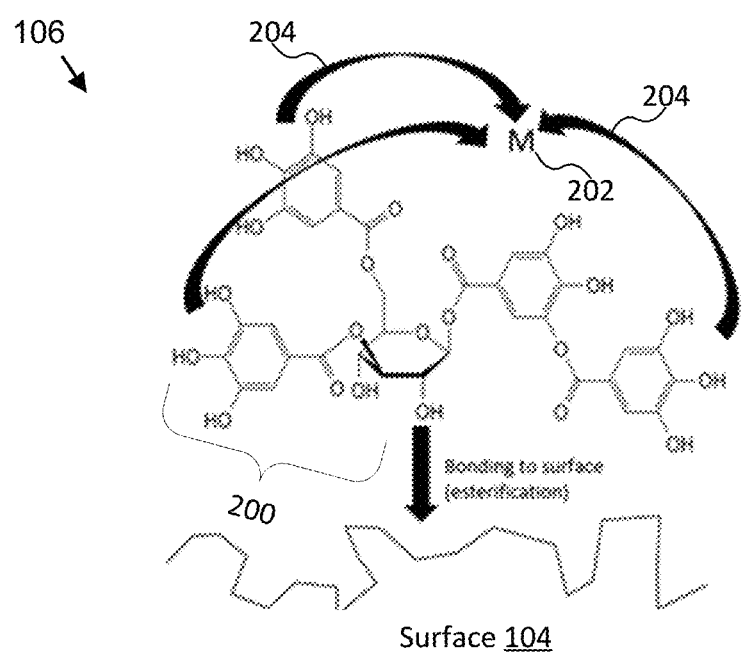
FIG. 2 is a schematic diagram illustrating one example of a polyphenol coordination complex in accordance with the present disclosure.

FIG. 2 is a schematic diagram illustrating one example of a polyphenol-metal complex 106 in accordance with the present disclosure. The polyphenol-metal complex 106 is formed of polyphenol molecules 200 bonded to a central metal ion 202. Two or more separate coordinate bonds 204 couple the metal ion 202 to multiple-bonded polyphenol molecules 200 (i.e., ligands). As described above, the polyphenol-metal complex 106 couples to carboxylic acid groups, bonded to the surface of a polymer article, via esterification.

Figure 3:
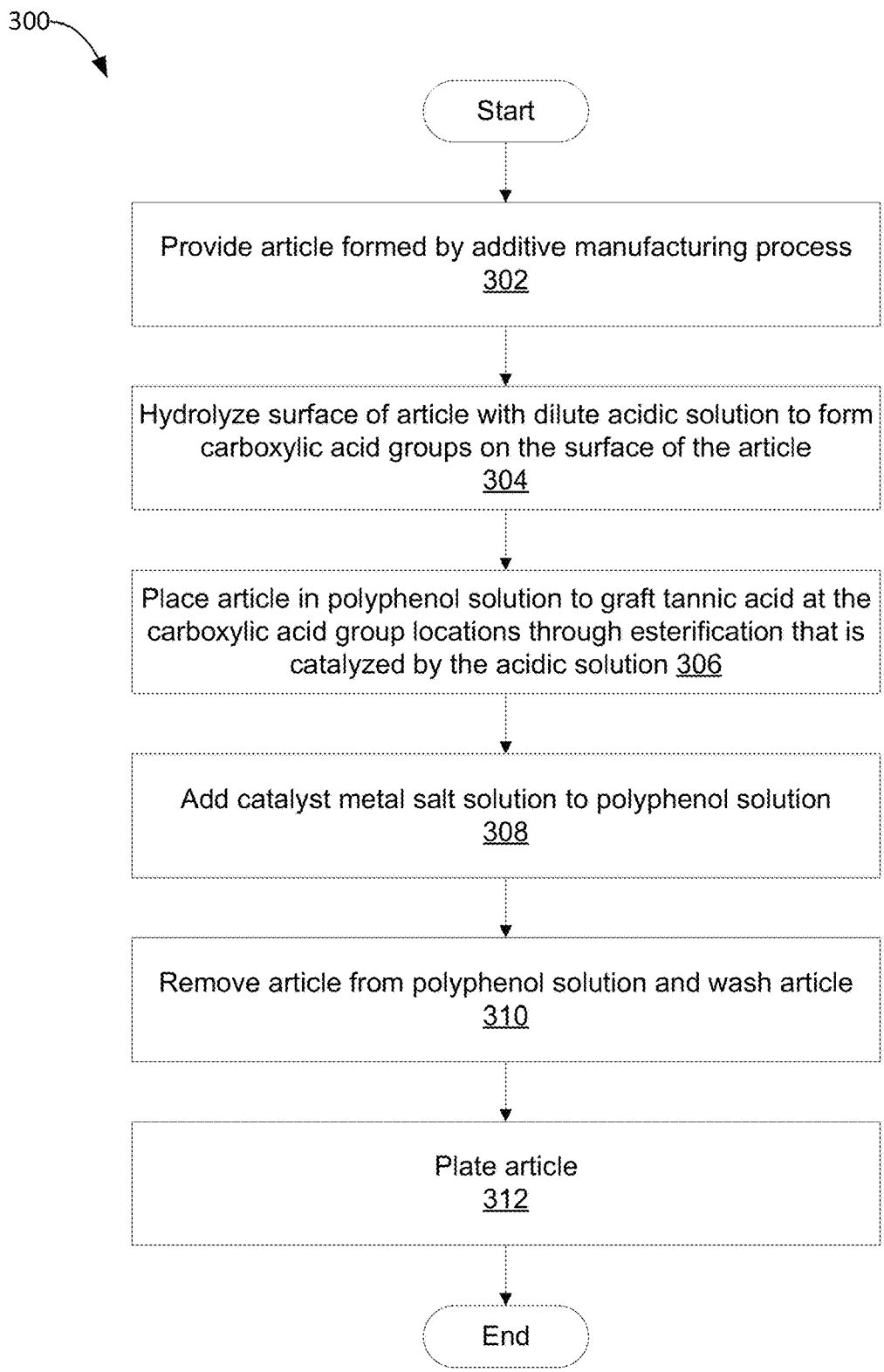
FIG. 3 is a method of preparing a polyamide article surface for improved adhesion in accordance with examples of the present disclosure.

FIG. 3 illustrates a method 300 of preparing a surface of a polymer article, such as the surface 104 of the article 100, for improved adhesion in accordance with examples of the present disclosure. The method 300 includes forming an article 100 by additive manufacturing at step 302. At step 304, the method 300 includes hydrolyzing the surface of the article 100 by treating the surface 104 with a dilute acidic solution to form carboxylic acid groups.

At step 306 of the method 300, the surface of the article is treated with a polyphenol solution. Acid left over from step 304 catalyzes esterification of the polyphenol solution with the carboxyl groups to bond polyphenol molecules to the surface of the article. At step 308 of the method 300, a catalyst metal salt solution is added to the polyphenol solution to chelate metal ions to the polyphenol molecules. At step 310 of the method 300, the article is removed from the solution and washed, which places the polymer article in condition for plating. At step 312 of the method 300, the article is plated by treating the polymer article with an electroless metal plating bath. Alternative methods of plating may be used as described above.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of preparing a polymer surface for electroless metal plating, the method comprising:
providing a polymer article;
hydrolyzing a surface of the polymer article using an acidic solution to obtain carboxylic acid groups at the surface;

grafting polyphenols to the carboxylic acid groups by esterification that is catalyzed by the acidic solution; and chelating metal ions to the grafted polyphenols to form polyphenol-metal complexes.

2. The method of claim 1, further comprising forming the polymer article by additive manufacturing.

3. The method of claim 2, wherein the polymer article is made of a synthetic polyamide.

4. The method of claim 3, wherein the synthetic polyamide is selected from the group consisting of polyamide 11 and polyamide 12.

5. The method of claim 1, wherein the polyphenol comprises tannic acid.

6. The method of claim 1, wherein chelating metal ions to the grafted polyphenols further comprises treating the surface with a metal salt solution.

7. The method of claim 6, where the metal salt solution comprises a solution having a metal selected from the group consisting of Fe, Ni, Ru, Rh, Pd, Ag, Os, Ir, Pt, and Au.

8. A metal-coated polymer device comprising:
a body formed by additive manufacturing; and
a metal plating formed on a surface of the body by electroless metal plating subsequent to a surface preparation process, where the surface preparation process comprises:
treating the surface with an acidic solution to obtain carboxylic acid groups at the surface;
treating the surface with a polyphenol solution to obtain polyphenols grafted to the carboxylic acid groups; and
chelating metal ions to the polyphenols.

9. The metal-coated polymer device of claim 8, where the body is made of a synthetic polyamide.

10. The metal-coated polymer device of claim 9, where the synthetic polyamide is selected from the group consisting of polyamide 11, and polyamide 12.

11. The metal-coated polymer device of claim 8, where the polyphenol comprises tannic acid.

12. The metal-coated polymer of claim 8, where chelating metal ions to the polyphenols further comprises treating the surface with a metal salt solution.

13. The metal-coated polymer of claim 12, where the metal salt solution comprises a solution having a metal selected from the group consisting of Fe, Ni, Ru, Rh, Pd, Ag, Os, Ir, Pt, and Au.

14. A method of metal plating a polymer article, the method comprising:
treating a polymer article with an acidic solution to hydrolyze a surface of the polymer article and obtain carboxylic acid groups at the surface;
treating the polymer article with a polyphenol solution to graft polyphenol molecules to the carboxylic acid groups;
treating the polymer article with a metal salt solution to form polyphenol-metal complexes; and
treating the polymer article with an electroless metal plating bath to metal plate the surface.

15. The method of claim 14, where the polymer article is formed by additive manufacturing.

16. The method of claim 15, where the polymer article is made of a synthetic polyamide.

17. The method of claim 16, where the synthetic polyamide is selected from the group consisting of polyamide 11, and polyamide 12.

18. The method of claim 14, where the polyphenol solution comprises tannic acid.

19. The method of claim 14, where treating the polymer article with the metal salt solution comprises chelating metal ions to the grafted polyphenol molecules.

20. The method of claim 19, where the metal salt solution comprises a solution having a metal selected from the group consisting of Fe, Ni, Ru, Rh, Pd, Ag, Os, Ir, Pt, and Au.

* * * * *